(12) United States Patent
Nagashima et al.

(10) Patent No.: US 8,865,815 B2
(45) Date of Patent: Oct. 21, 2014

(54) STAIN-RESISTANT COATING MATERIAL AND PRODUCT HAVING GLASS LAYER

(75) Inventors: Osamu Nagashima, Tokyo (JP); Masashi Miura, Tokyo (JP); Norifumi Isu, Tokyo (JP)

(73) Assignee: Lixil Corporation, Tokyo (JP)

( * ) Notice: Subject to any disclaimer, the term of this patent is extended or adjusted under 35 U.S.C. 154(b) by 177 days.

(21) Appl. No.: 13/382,632

(22) PCT Filed: Jun. 7, 2010

(86) PCT No.: PCT/JP2010/059622
§ 371 (c)(1),
(2), (4) Date: Jan. 6, 2012

(87) PCT Pub. No.: WO2011/007630
PCT Pub. Date: Jan. 20, 2011

(65) Prior Publication Data
US 2012/0107623 A1     May 3, 2012

(30) Foreign Application Priority Data

Jul. 15, 2009 (JP) ................................. 2009-166471

(51) Int. Cl.

| C08K 5/05 | (2006.01) |
| C03C 17/30 | (2006.01) |
| C09D 7/00 | (2006.01) |
| C04B 41/48 | (2006.01) |
| C09D 5/16 | (2006.01) |
| C09D 129/10 | (2006.01) |
| C04B 41/83 | (2006.01) |
| C04B 41/00 | (2006.01) |
| C04B 111/20 | (2006.01) |

(52) U.S. Cl.
CPC ............. C04B 41/83 (2013.01); C03C 17/30 (2013.01); C09D 7/001 (2013.01); C04B 2111/2092 (2013.01); C04B 41/4846 (2013.01); C09D 5/1662 (2013.01); C09D 129/10 (2013.01); C04B 41/009 (2013.01)
USPC ............................ 524/379; 524/474; 524/475

(58) Field of Classification Search
USPC ........................................ 524/379, 474, 475
See application file for complete search history.

(56) References Cited

U.S. PATENT DOCUMENTS

| 6,709,751 B1 | 3/2004 | Mizuno et al. |
| 7,294,731 B1 | 11/2007 | Flynn et al. |

FOREIGN PATENT DOCUMENTS

| CN | 101456947 | 6/2009 |
| JP | 11 29585 | 2/1999 |
| JP | 11 84103 | 3/1999 |
| JP | 2000 290089 | 10/2000 |

OTHER PUBLICATIONS

English translation of the International Preliminary Report on Patentability issued Feb. 16, 2012, in PCT/JP2010/059622.
English translation of the Written Opinion of the International Searching Authority issued Aug. 3, 2010, in PCT/JP2010/059622.
International Search Report Issued Aug. 3, 2010 in PCT/JP10/59622 Filed Jun. 7, 2010.
Office Action as received in the corresponding Chinese Patent Application No. 201080031641.3 dated Dec. 20, 2013 w/English translation.
Examination Result issued on Aug. 20, 2013 in Japanese Application (JP2009-166471) (w/English Translation).
Office Action as received in the corresponding Taiwanese Patent Application No. 103-6-01212-10320948600 dated Jul. 11, 2014 w/English Translation.
Office Action as received in the Chinese Patent Application No. 201080031641.3 dated Aug. 19, 2014 w/English Translation.

*Primary Examiner* — Edward Cain
(74) *Attorney, Agent, or Firm* — Oblon, Spivak, McClelland, Maier & Neustadt, L.L.P.

(57) ABSTRACT

The invention is intended to easily enhance both the stain-resistant property against water scale and the stain-resistant property against oily components, in sanitary ceramic wares and the like which are brought into contact with water containing soluble silica as well as oily components. The stain-resistant coating material of the invention contains a main agent formed from a perfluoropolyether, and a solvent including an alkane and an alcohol, while the alkane has mean molecular weight of 138 to 180 g/mol.

25 Claims, 1 Drawing Sheet

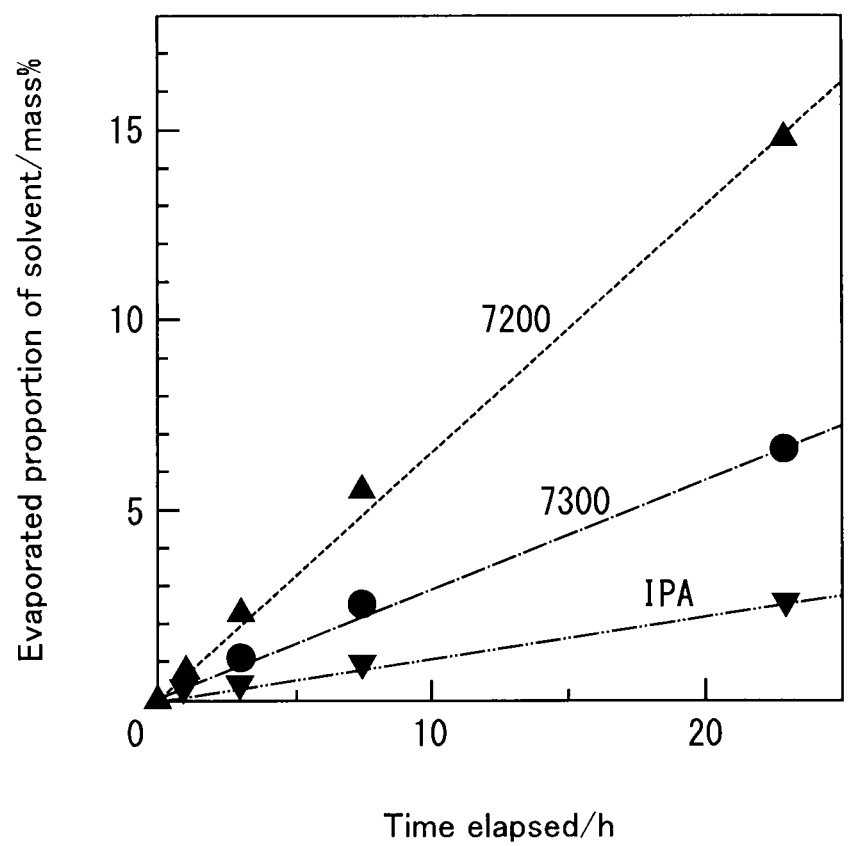

STAIN-RESISTANT COATING MATERIAL AND PRODUCT HAVING GLASS LAYER

This application is a National Stage of PCT/JP10/059622 filed Jun. 7, 2010 and claims the benefit of JP 2009-166471 filed Jul. 15, 2009.

TECHNICAL FIELD

The present invention relates to a stain-resistant coating material, and a product having a glass layer, such as sanitary ceramic wares and glass products. Sanitary ceramic wares and the like have a glass layer, and this glass layer may be brought into contact with water containing soluble silica. The stain-resistant coating material according to the present invention is capable of imparting stain-resistant property to the glass layer of products having such a glass layer.

BACKGROUND ART

A stain-resistant coating material as disclosed in Patent Document 1 has been conventionally known. This stain-resistant coating material is a mixture of a first agent and a second agent. The first agent is an article obtained by preparing a perfluoroalkyl group-containing organosilicon compound and a hydrolysable group-containing methylpolysiloxane compound, and co-hydrolyzing these compounds in a hydrophilic solvent including 0.1 N aqueous hydrochloric acid solution, t-butanol and hexane. The second agent is a mixture of an organopolysiloxane and methanesulfonic acid as a strong acid.

This stain-resistant coating material is considered to be composed of an addition compound in which plural molecules are complicatedly intertwined, or a kind of polymer. When this stain-resistant coating material is applied on the surface of the glaze layer of a sanitary ceramic ware or on the surface of a glass product, a stain-resistant layer is formed as the stain-resistant coating material dries. The stain-resistant layer is bonded to the hydroxyl groups present on the surface of the glaze layer or glass, and shields the hydroxyl groups to make them incompetent. For this reason, even when the sanitary ceramic ware or the glass product is brought into contact with water containing soluble silica, attachment of soluble silica to the hydroxyl groups can be prevented, and attachment of water scale caused by soluble silica is prevented, so that the accumulation of contaminant components on the water scale can be effectively prevented.

CITATION LIST

Patent Literature

Patent Document 1: Japanese Patent No. 4226136

SUMMARY OF INVENTION

Problem to be Solved by Invention

However, according to the test results obtained by the inventors, the above conventional stain-resistant coating material is such that oily components are prone to stick to the stain-resistant layer. Therefore, for example, when the sanitary ceramic ware is a flush toilet, there are occasions in which the oily components in feces stick to the stain-resistant layer at the surface of the flush toilet, and contaminant components accumulate on the oily components. The same applies to glass products which are brought into contact also with oily components as well as water containing soluble silica. For this reason, a further enhancement of stain-resistant property has been desired for these sanitary ceramic wares and glass products.

The present invention was made under such conventional circumstances, and an object of the present invention is to easily enhance both the stain-resistant property against water scale and the stain-resistant property against oily components in the sanitary ceramic wares and the like that are brought into contact with water containing soluble silica as well as oily components.

Means for Solving Problem

The stain-resistant coating material of the present invention contains a main agent formed from a perfluoropolyether, and a solvent including an alkane and an alcohol, wherein the alkane has mean molecular weight of 138 to 180 g/mol.

According to the test results of the inventors, in this stain-resistant coating material, the stain-resistant layer shields the hydroxyl groups present at the surface of a glaze layer, thereby making the hydroxyl groups incompetent, and also oily components do not easily stick to the stain-resistant layer.

Therefore, when the stain-resistant coating material of the present invention is used, the stain-resistant property against water scale and the stain-resistant property against oily components can be easily enhanced together in sanitary ceramic wares and the like that are brought into contact with water containing soluble silica as well as oily components.

The stain-resistant coating material of the present invention contains a main agent and a solvent. The main agent is formed from a perfluoropolyether, and the solvent includes an alkane and an alcohol.

The stain-resistant coating material may contain hydrochloric acid as a catalyst (a reaction accelerating agent). According to the test results obtained by the inventors, when hydrochloric acid is used as a catalyst, the stain-resistant coating material of the present invention has excellent reactivity, workability and the like. According to the test results obtained by the inventors, the stain-resistant coating material preferably contains hydrochloric acid at a concentration of 0.1 to 1.0 g/L.

Furthermore, the solvent of the stain-resistant coating material may include a fluorine-based solvent. According to the test results obtained by the inventors, when the solvent includes a fluorine-based solvent, a uniform and stable stain-resistant coating material can be obtained. As the fluorine-based solvent, hydrofluoroether or the like may be employed.

In regard to the perfluoropolyether, for example, the compound of the following formula, which is disclosed in Japanese Patent Application Laid-Open (JP-A) No. 11-29585, may be employed.

[Chemical Formula 1]

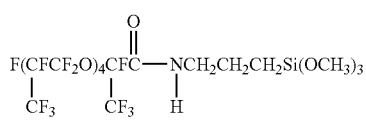

In regard to the alkane, various compounds may be employed as long as they are chain-like or cyclic saturated hydrocarbons represented by the formula: $C_nH_{2n+2}$. For example, when a paraffin is employed as the alkane, a normal paraffin, an isoparaffin and/or a cycloparaffin may be employed.

According to the test results obtained by the inventors, the effects of the present invention can be exhibited when the mean molecular weight of the alkane is 138 to 180 g/mol. If the mean molecular weight of the alkane is less than 138 g/mol, because a high vapor pressure occurs after the stain-resistant coating material is applied, the water retention effect is low, and therefore, it is difficult for the stain-resistant coating material to form a stable stain-resistant layer. If the mean molecular weight of the alkane is larger than 180 g/mol, the viscosity of the stain-resistant coating material becomes too high, so that steric hindrance between molecules within the stain-resistant layer is likely to occur, and it is difficult for the stain-resistant coating material to form a stain-resistant layer having excellent smoothness.

According to the test results obtained by the inventors, the alkane is preferably an isoparaffin. In this case, the effects of the present invention are confirmed.

In regard to the alcohol, various compounds may be employed as long as they are substances obtained by substituting a hydrogen atom of a hydrocarbon with a hydroxyl group. For example, in the case of employing butanol as the alcohol, 1-butanol (n-butanol), 2-methyl-1-propanol (isobutanol), 2-butanol (sec-butanol), 2-methyl-2-propanol (tert-butanol (t-butanol)) and the like may be employed.

Furthermore, according to the test results obtained by the inventors, the alcohol is preferably t-butanol. In this case, the effects of the present invention are confirmed.

According to the test results obtained by the inventors, it is also preferable to employ ethanol as the alcohol. In this case, according to the test results obtained by the inventors, reduction of the production cost can be realized without causing a large decrease in the product quality.

The product of the present invention has a glass layer which may be brought into contact with water containing soluble silica, and the above-described stain-resistant coating material is applied on the surface of the glass layer. Since this product, as a sanitary ceramic ware such as a flush toilet or a washbasin, or a glass product, can exhibit stain-resistant property over a long time period without having water scale, its fine appearance can be maintained for a long time.

BRIEF DESCRIPTION OF DRAWING

FIG. 1 is a graph showing the relationship between the elapsed time and the evaporated proportion of the solvent, in the case where a silane coupling agent is diluted with a fluorine-based solvent according to Test Example 6.

DESCRIPTION OF EMBODIMENTS

Hereinafter, the present invention will be described in detail by way of Test Examples 1 to 6.

Test Example 1

A silane coupling agent ("X-71-107B(3)" manufactured by Shin-Etsu Chemical Co., Ltd.) is provided as a main agent. This silane coupling agent has a perfluoropolyether (PFPE) in its main chain. Furthermore, t-butanol (manufactured by Wako Pure Chemical Industries, Ltd.) and five kinds of isoparaffins (Isopar E to Isopar M (manufactured by Exxon Mobil Corp.)) are also provided. As indicated in Table 1, Isopar E to Isopar M differ in the mean molecular weight, density, viscosity and vapor pressure, depending on the distillation temperature range. Meanwhile, Isopar L+M is an article prepared by mixing Isopar L and Isopar M to obtain mean molecular weight of 180 g/mol.

TABLE 1

|  | Distillation range | | | Mean molecular weight (g/mol) | Density (g/ml) | Viscosity $(mm^2/s)$ Measured value at 25° C. | Vapor pressure (KPa) Estimated value at 20° C. |
| --- | --- | --- | --- | --- | --- | --- | --- |
|  | Initial boiling point (° C.) | 50% (° C.) | Dry point (° C.) |  |  |  |  |
| Isopar E | 114 | 118 | 138 | 121 | 0.724 | 0.85 | 2.15 |
| Isopar G | 159 | 164 | 176 | 138 | 0.750 | 1.13 | 0.3 |
| Isopar H | 177 | 182 | 188 | 156 | 0.759 | 1.80 | 0.1 |
| Isopar L | 188 | 194 | 208 | 162 | 0.768 | 1.64 | 0.069 |
| Ispar L + M | — | — | — | 180 | — | — | — |
| Isopar M | 222 | 234 | 255 | 193 | 0.791 | 2.43 | 0.01 |

A coating material for Test Article 1 was obtained by using t-butanol only as the solvent, and diluting the silane coupling agent 20 times with this solvent. Furthermore, coating materials for Test Articles 2 to 7 were obtained by mixing t-butanol and each of Isopar E to Isopar M at a volume ratio of 1:1 to prepare various solvents, and diluting the silane coupling agent 20 times with each of the solvents. Concentrated hydrochloric acid (manufactured by Wako Pure Chemical Industries, Ltd.) was added as a catalyst (reaction accelerating agent) to each of the coating materials for Test Articles 1 to 7 at a concentration of 1 g/L, and thus stain-resistant coating materials of Test Articles 1 to 7 were obtained.

Specimens of sanitary ceramic wares were prepared, and the respective stain-resistant coating materials were applied thereon at normal temperature to obtain samples. For each of the samples, the initial water contact angle (°) with its standard deviation as well as the water contact angle (°) and its standard deviation after performing 10000 times of rubbing using a commercially available sponge while applying a load of 1.7 kgf were measured. The results are presented in Table 2.

TABLE 2

|  | Alcohol | Isoparaffin | Initial Water contact angle (°) | Initial Standard deviation | After 10000 times of rubbing Water contact angle (°) | After 10000 times of rubbing Standard deviation |
|---|---|---|---|---|---|---|
| Test Article 1 | t-butanol | — | 92.4 | 5.6 | — | — |
| Test Article 2 | t-butanol | Isopar E | 90.5 | 8.7 | 87.5 | 6.7 |
| Test Article 3 | t-butanol | Isopar G | 104.6 | 3.0 | 97.2 | 5.0 |
| Test Article 4 | t-butanol | Isopar H | 104.2 | 1.9 | 98.5 | 3.4 |
| Test Article 5 | t-butanol | Isopar L | 107.1 | 1.2 | 102.3 | 1.2 |
| Test Article 6 | t-butanol | Isopar L + M | 107.3 | 1.2 | 102.2 | 1.4 |
| Test Article 7 | t-butanol | Isopar M | 105.4 | 1.1 | — | — |

As shown in Table 2, when the silane coupling agent is hydrolyzed together with the SiOH groups of the glaze layer of the sanitary ceramic wares, the property changes with the type of the isoparaffin. However, in the stain-resistant coating material of Test Article 2 which used Isopar E having a low distillation temperature range, because the vapor pressure of Isopar E after being applied was low, no water retention effect was obtained, and therefore, the reaction was difficult to occur. On the other hand, in the stain-resistant coating material of Test Article 7 which used Isopar M having a high distillation temperature range, because the viscosity of Isopar M was high, steric hindrance between molecules could occur when the silane coupling agent reacted.

It can be seen that when the stain-resistant coating materials of Test Articles 3 to 6, which used Isopar G, H and L having mean molecular weights of 138 to 180 g/mol, were used, the water contact angles were large, and their standard deviations were small. Therefore, in the case of these stain-resistant coating materials, the stain-resistant layers shield the hydroxyl groups present at the surface of the glaze layer, thereby making the hydroxyl groups incompetent. For this reason, sanitary ceramic wares and the like that are brought into contact with water containing soluble silica can exhibit stain-resistant property over a long time period without having water scale, and therefore, its fine appearance can be maintained for a long time.

Test Example 2

In addition to the silane coupling agent of Test Example 1, a coupling agent having a fluoroalkyl group (FA) in its main chain is provided as a main agent. The solvent is t-butanol, or t-butanol and Isopar L. As indicated in Table 3, the concentration of the main agent was adjusted to 0.60% by mass or 0.15% by mass, and thus stain-resistant coating materials of Test Articles 8 to 11 were obtained. In Test Articles 10 and 11, slightly less than 5% of a hydrofluoroether (HRE-7200, manufactured by 3M Company) was included as a fluorine-based solvent, so as to secure stability of the stain-resistant coating materials.

TABLE 3

|  | Main chain of main agent | Concentration of main agent (mass %) | Solvent | Water contact angle (°) | Water sliding angle (°) | Oil contact angle (°) | Oil sliding angle (°) |
|---|---|---|---|---|---|---|---|
| Test Article 8 | PF | 0.60 | t-butanol | 106.9 | 34.8 | 59.2 | 13.7 |
| Test Article 9 | PF | 0.60 | t-butanol, Isopar L | 97.2 | 39.0 | 48.1 | 7.8 |
| Test Article 10 | PFPE | 0.15 | t-butanol | 92.4 | 61.8 | 45.6 | 8.2 |
| Test Article 11 | PFPE | 0.15 | t-butanol, Isopar L | 108.5 | 34.8 | 62.9 | 7.3 |

For the samples produced with use of these various stain-resistant coating material in the same manner as in Test Example 1, the water contact angle (°), the water sliding angle (°), the oil contact angle (°), and the oil sliding angle (°) were measured. The water sliding angle is an angle of inclination when a water droplet having a volume of 20 µl starts to slide down as the surface of the samples are inclined with respect to a horizontal surface. A smaller water sliding angle is more preferred. The oil sliding angle is an angle of inclination when an oil droplet having a volume of 20 µl starts to slide down as the surface of the samples are inclined with respect to a horizontal surface. A smaller oil sliding angle is more preferred. The results are also presented in Table 3.

As shown in Table 3, it can be seen that a stain-resistant coating material which uses a PFPE-based silane coupling agent in combination with t-butanol and Isopar L is preferred. When an FA-based silane coupling agent is employed, satisfactory results are obtained when only t-butanol is used as the solvent; however, the reason for this is not clearly understood. The influence of the polarity of the silane coupling agent, or the like can be considered.

Test Example 3

The stain-resistant coating material of Test Article 11 and the stain-resistant coating material of Reference Example, which was employed in Example 1 of Japanese Patent No. 4226136, were used, and the water contact angle (°) and the oil sliding angle (°) were measured in the same manner as in Test Example 2. Meanwhile, the stain-resistant coating material of the Reference Example has a concentration of the silane coupling agent of 2.5% by mass. The results are presented in Table 4.

TABLE 4

|  | Water contact angle (°) | Oil sliding angle (°) |
| --- | --- | --- |
| Test Article 11 | 108.5 | 7.3 |
| Reference Example | 108.8 | 26.2 |

The stain-resistant coating material of the Reference Example and the stain-resistant coating material of Test Article 11 showed almost no difference in the water contact angle. On the other hand, because the stain-resistant coating material of the Reference Example contains dimethylsiloxane which has strong affinity with oil, the oil sliding angle was large in the case of the stain-resistant coating material of the Reference Example, whereas the oil sliding angle was small in the case of the stain-resistant coating material of Test Article 11.

Therefore, it can be seen that, in the stain-resistant coating material of Test Article 11, the stain-resistant layer shields the hydroxyl groups present at the surface of the glaze layer, thereby making the hydroxyl groups incompetent, and oily components do not easily stick to the stain-resistant layer. For this reason, it can be seen that when the stain-resistant coating material of Test Article 11 is used, both the stain-resistant property against water scale and the stain-resistant property against oily components can be easily enhanced in sanitary ceramic wares and the like which are brought into contact with water containing soluble silica as well as oily components.

Test Example 4

Isopar L and various types of alcohol-based solvents were employed for the silane coupling agent of Test Example 1, and a comparison was made for the properties of resulting stain-resistant coating materials. As the alcohol-based solvents, methanol, ethanol, i-propanol, n-butanol, t-butanol, 2-hexyldecanol and 2-methoxyethanol were provided.

Solvents were prepared by mixing the solvents such that solvent 1:solvent 2=alcohol-based solvent:alkane-based solvent=1:1, and the silane coupling agent of Test Example 1 was diluted 20 times with each of the solvents. Thus, stain-resistant coating materials of Test Articles 12 to 18 were prepared in the same manner as in Test Example 1. However, when methanol or 2-methoxyethanol was used as the solvent 1, as these alcohols were mixed with Isopar L, the liquid mixtures separated into two layers and consequently no stain-resistant coating materials was obtained.

Subsequently, respective samples were obtained in the same manner as in Test Example 1, and the samples were respectively subjected to the same abrasion test as that performed in Test Example 1. For the respective samples applied with the stain-resistant coating materials of Test Articles 12 to 18, the water contact angles (°) before and after the abrasion test were measured. The results are presented in Table 5.

TABLE 5

|  | Main chain of main agent | Solvent 1 | Solvent 2 | Water contact angle (°) Before abrasion test | After abrasion test |
| --- | --- | --- | --- | --- | --- |
| Test Article 12 | PFPE | Methanol | Isobar L | — | — |
| Test Article 13 | ↑ | Ethanol | ↑ | 106.4 | 102.2 |
| Test Article 14 | ↑ | i-propanol | ↑ | 107.0 | 97.9 |
| Test Article 15 | ↑ | n-butanol | ↑ | 71.3 | 73.1 |
| Test Article 16 | ↑ | t-butanol | ↑ | 107.8 | 101.9 |
| Test Article 17 | ↑ | 2-Hexyldecanol | ↑ | 66.5 | 48.9 |
| Test Article 18 | ↑ | 2-Methoxyethanol | ↑ | — | — |

As can be seen from Table 5, the stain-resistant coating materials having large water contact angles were Test Articles 13 and 16 which used ethanol and t-butanol, respectively, as the solvent 1. Meanwhile, the stain-resistant coating material of Test Article 15 which used n-butanol as the solvent 1 exhibited very large fluctuations as compared with other samples, and the contact angle varied at different measurement points (positions). The increase in the contact angle after abrasion is considered to be due to the difference in the measurement points. The property values of the respective alcohols are presented in the following Table 6.

TABLE 6

|  | Density (g/cm$^3$) | Vapor pressure (mmHg) | Viscosity (Pas) | Surface tension (N/m) | Refractive index |
| --- | --- | --- | --- | --- | --- |
| Methanol | 0.791 | 409.9 | 0.000614 | — | 1.329 |
| Ethanol | 0.789 | 44.59 | 0.0012 | 0.02275 | 1.36 |
| i-propanol | 0.785 | 32.99 | 0.00208 | 0.02119 | 1.377 |
| n-butanol | 0.81 | 7.24 | 0.00255 | 0.02628 | 1.399 |
| t-butanol | 0.775 | 30.99 | — | — | 1.387 |
| 2-Hexyldecanol | 0.836 | 0.041 | 0.029 | — | 1.449 |
| 2-Methoxyethanol | 0.965 | 6.169 | 0.00153 | 0.033 | 1.402 |

Test Example 5 t-Butanol and various types of alkane-based solvents were employed for the silane coupling agent of Test Example 1, and a comparison was made on the properties of the resulting stain-resistant coating materials. As the alkane-based solvents, n-hexane, n-heptane, n-decane, n-dodecane, n-pentadecane, n-hexadecane, toluene and Isopar L were provided.

Solvents were prepare by mixing the solvents such that solvent 1:solvent 2=alcohol-based solvent:alkane-based solvent=1:1, and the silane coupling agent of Test Example 1 was diluted 20 times with each of the solvents. Thus, stain-resistant coating materials of Test Articles 19 to 26 were prepared in the same manner as in Test Example 1.

Subsequently, respective samples were obtained in the same manner as in Test Example 1, and the samples were respectively subjected to the same abrasion test as that performed in Test Example 1. For the respective samples applied with the stain-resistant coating materials of Test Articles 19 to 26, the water contact angles (°) before and after the abrasion test were measured. The results are presented in Table 7.

TABLE 7

| | Main chain of main agent | Solvent 1 | Solvent 2 Carbon chain | Compound name/conventional name | Water contact angle (°) Before abrasion test | After abrasion test | Difference |
|---|---|---|---|---|---|---|---|
| Test Article 19 | PFPE | t-butanol | Straight-chained C6 | n-hexane | 110.6 | 99.6 | 11.0 |
| Test Article 20 | ↑ | ↑ | Straight-chained C7 | n-heptane | 110.1 | 99.8 | 10.3 |
| Test Article 21 | ↑ | ↑ | Straight-chained C10 | n-decane | 108.4 | 99.6 | 8.8 |
| Test Article 22 | ↑ | ↑ | Straight-chained C12 | n-dodecane | 104.9 | 99.6 | 5.3 |
| Test Article 23 | ↑ | ↑ | Straight-chained C15 | n-pentadecane | 107.6 | 101.7 | 5.9 |
| Test Article 24 | ↑ | ↑ | Straight-chained C16 | n-hexadecane | 106.5 | 99.9 | 6.6 |
| Test Article 25 | ↑ | ↑ | Aromatic C7 | Toluene | 105.5 | 96.6 | 8.9 |
| Test Article 26 | ↑ | ↑ | Mixture | Isopar L | 107.8 | 101.9 | 5.9 |

In any of the stain-resistant coating materials which used straight-chained alkanes, an aromatic and Isopar L, no significant difference was observed between the water contact angles before and after the abrasion test. In particular, the stain-resistant coating material which used Isopar L had the largest water contact angle even after the abrasion test, while the difference was small. However, the stain-resistant coating material of Test Article 25 which used toluene being an aromatic hydrocarbon exhibited a slightly larger difference between the contact angles.

Test Example 6

An investigation was conducted on possible problems and cautions in the case of diluting the silane coupling agent ("X-71-107B(3)" manufactured by Shin-Etsu Chemical Co., Ltd.) as the main agent with a fluorine-based solvent. In addition to 2-propanol (IPA, manufactured by Wako Pure Chemical Industries, Ltd.), a hydrofluoroether (HFE-7200, manufactured by 3M Company) and another hydrofluoroether (NOVEC7300, manufactured by 3M Company) were provided as fluorine-based solvents.

Each of the fluorine-based solvents was placed in a sample tube (φ=14.3 mm) in an amount of 10 mL each, and the sample tube was left to stand with its opening opened at 18° C. to 20° C. and 46% to 60% RH. The volatilization amounts of the fluorine-based solvents were continuously measured by measuring the weight of the solvents. However, the increase in weight due to the incorporation of water vapor into the solvent was not taken into consideration. The results are presented in Table 8 and FIG. 1.

TABLE 8

| | Density (g/cm$^3$) | Rate of evaporation (mass %/h) |
|---|---|---|
| IPA | 0.77 | 0.068 |
| 7200 | 1.42 | 0.343 |
| 7300 | 1.65 | 0.164 |

As shown in Table 8 and FIG. 1, in any of the fluorine-based solvents, the evaporated proportions were almost constant even after a lapse of time. Furthermore, the rates of evaporation of HFE-7200 and NOVEC7300, which are fluorine-based solvents, were faster than that of IPA. It can be speculated that HFE-7200 and NOVEC7300, which are recommended solvents for PFPE, are both ethers, and therefore, they have high volatility. From these results, it can be said that when fluorine-based solvents are used in processes, there are problems of difficult concentration management and easy exposure to the vapors of the fluorine-based solvents.

Furthermore, IPA and HFE-7200 were placed in separate sample tubes (φ=14.3 mm) in an amount of 9 mL each, and 1 mL each of a silane coupling agent ("X-71-107B(3)" manufactured by Shin-Etsu Chemical Co., Ltd.) and one drop (about 0.025 mL) each of 36% HCl were introduced into each of the sample tubes. These were sealed and left to stand, and the appearance was observed.

When IPA was used as the solvent, the stain-resistant coating material hardly clouded even after a lapse of 24 hours. However, when HFE-7200 was used as the solvent, the stain-resistant coating material clouded, and a material was generated which is assumed to have resulted from the polymerization of the main components in the stain-resistant coating material. From these results, it can be said that because the stain-resistant coating material undergoes deterioration if not used in a short time, strict handling is required including the need to frequently prepare dilutions, replace sponges at the time of coating process or the like.

As shown above, the present invention was illustrated by way of Test Examples 1 to 6; however, the present invention is not intended to be limited to the test products described above, and it is needless to say that appropriate modifications can be applied to the extent that the purport of the invention is maintained.

INDUSTRIAL APPLICABILITY

The present invention can be utilized in sanitary ceramic wares such as flush toilets and washbasins, and glass products.

The invention claimed is:

1. A coating material, comprising:
   a silane coupling agent comprising a perfluoropolyether group; and
   a solvent comprising an alkane having a mean molecular weight of 138 to 180 g/mol and an alcohol.

2. The coating material of claim 1, further comprising an accelerating agent.

3. The coating material of claim 1, wherein the solvent further comprises a fluorinated solvent.

4. The coating material of claim 1, wherein the alkane is an isoparaffin.

5. The coating material of claim 1, wherein the alcohol is tert-butanol.

6. The coating material of claim 1, wherein the alcohol is ethanol.

7. A product obtained by a process comprising applying the coating material of claim 1 to at least one surface of a glass layer.

8. The coating material of claim 2, wherein the accelerating agent is hydrochloric acid.

9. The coating material of claim 8, wherein a content of the hydrochloric acid in the coating material is 0.1 to 1.0 g/L.

10. The coating material of claim 3, wherein the fluorinated solvent is a hydrofluoroether.

11. The coating material of claim 1, wherein the alkane is at least one selected from the group consisting of a normal paraffin, an isoparaffin, and a cycloparaffin.

12. The coating material of claim 1, wherein the alkane is a normal paraffin.

13. The coating material of claim 1, wherein the alkane is a cycloparaffin.

14. The coating material of claim 1, wherein the alcohol is at least one selected from the group consisting of n-butanol, isobutanol, sec-butanol, and tert-butanol.

15. The coating material of claim 1, wherein the alcohol is at least one selected from the group consisting of ethanol, isopropanol, and tert-butanol.

16. The coating material of claim 1, wherein the alcohol is isopropanol.

17. The coating material of claim 1, wherein the agent has a formula (I):

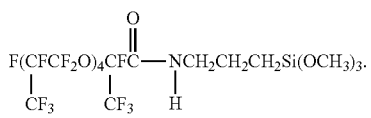

18. The coating material of claim 1, wherein the coating material is stain resistant.

19. The coating material of claim 4, wherein the alcohol is tert-butanol.

20. The coating material of claim 4, wherein the alcohol is ethanol.

21. The product of claim 7, wherein the coating material enhances resistance of the glass to water comprising soluble silica and an oily component.

22. A product obtained by a process comprising applying the coating material of claim 17 to at least one surface of a glass layer.

23. The coating material of claim 17, wherein the alcohol is at least one selected from the group consisting of n-butanol, isobutanol, sec-butanol, and tert-butanol.

24. The coating material of claim 17, wherein the alcohol is at least one selected from the group consisting of ethanol, isopropanol, and tert-butanol.

25. The product of claim 21, wherein the coating material enhances resistance of the glass to water comprising soluble silica and an oily component.

* * * * *